UNITED STATES PATENT OFFICE.

JACOUB AKTSCHOURIN, OF AKTSCHOURIN-TUPIK, RUSSIA.

METHOD FOR MANUFACTURING RESIN-SOAP AND RESIN.

1,103,336.

Specification of Letters Patent. Patented July 14, 1914.

No Drawing. Application filed January 8, 1913. Serial No. 740,855.

*To all whom it may concern:*

Be it known that I, JACOUB AKTSCHOURIN, manufacturer, a subject of the Czar of Russia, and residing at Aktschourin-Tupik, in the Empire of Russia, have invented certain new and useful Improvements in Methods for Manufacturing Resin-Soap and Resin, of which the following is a specification.

In the ordinary methods of treating shavings obtained from resinous or coniferous trees, for the purpose of recovering the resin, with alkaline solutions or with indifferent solvents, such as benzin, ligroin, alcohol, carbon bisulphid, the resin soap as well as the resin itself recovered from said shavings are greatly changed by the oxidation taking place as well as by other conditions. This is especially the case when free resin is recovered from alkaline solutions, according to one of the well known methods, and the lye itself is of small value only, because it contains products of decomposition of the lignin. These defects are avoided by the use of my new method, inasmuch as the entire process of lixiviating and decomposing the alkaline soap solution and the dissolving of the resinous substances are carried out in the presence of reducing agents, *i. e.* salts of sulfurous acids, sulfurous anhydrid, hydrosulfite and similar reducing agents. The use of these reducing agents is resorted to for the purpose of retaining the lignin insoluble in the lye. The resin obtained by my new process is of high quality, and besides, much larger quantities of resin are recovered. If equal quantities of the same reducing agent were subsequently used on crude resin which has been obtained in the ordinary way, the results would not be the same.

The following is an example of my new process: Shavings from resinous or coniferous trees are treated in a solution of sodium hydroxid, or soda of 4° to 7° B. in the presence of, say, a 3% solution of hydrosulfite ($Na_2S_2O_4$). The amount of the latter solution depends on the amount of shavings which are being treated. Before the lye is added to the shavings some terpene is removed by distillation with steam, if the shavings contain a great amount of resin, otherwise the steam distillation at the beginning of the process is dispensed with. The treatment with steam and subsequently with the lye solution is carried out in closed boilers, the lye solution being made to circulate through the shavings, which can be effected by the use of a steam injector. The extraction of the resin occurs at a temperature of about 90° C. and at a pressure varying from 2 to 3 atmospheres. After 4 to 6 hours the lye solution is drawn off from the shaving and, if desired, is used again for the boiling of fresh shavings, which depends on the amount of resin contained in the shavings. The remaining shavings, after the solution has been drawn off, are washed with steam and hot water, the steam in that case carrying with it a certain amount of terpene which is later recovered by condensation. The wash water is again added to the lye solution. For the purpose of recovering the resin from the latter, the solution is either brought directly to a state of decomposition, viz. in case where the shavings were rich in resin, or the resin soap is first salted out.

The decomposition of the lye solution is effected in closed boilers at a temperature of about 100° C. by means of such an amount of acid as is required for the decomposition of the resin soap in solution, the lignin remaining almost entirely in the solution.

The resin which has been recovered from the solution, is separated from the solution by filtration and transferred to closed boilers which are provided with a screen at the bottom. In these boilers the resin is heated for several hours to a temperature of about 90° C., and is then forced, by the aid of steam, through the screen against the bottom of the boiler, after which the resin, like pine-resin, is further treated to produce technical resin.

The specific reaction taking place in my process is brought about by the presence of the reducing agent which, as has been proved by experiments, retains the lignin in an insoluble condition in the lye.

I claim as my invention:

Process of recovering resin soap or resin from resinous or coniferous trees, which process consists in first treating the shavings from such trees with an alkaline solution, in the presence of a reducing agent, and then separating the resinous substances from the solution.

In testimony whereof I affix my signature in presence of two witnesses.

JACOUB AKTSCHOURIN.

Witnesses:
 LYDIA RÖLL,
 CHR. ERFEST.